United States Patent
Ho

(10) Patent No.: US 10,792,867 B2
(45) Date of Patent: Oct. 6, 2020

(54) METHOD FOR MANUFACTURING CURVED SURFACE SHELL OF ELECTRONIC DEVICE

(71) Applicant: Ying-Hsin Ho, Tainan (TW)

(72) Inventor: Ying-Hsin Ho, Tainan (TW)

( * ) Notice: Subject to any disclaimer, the term of this patent is extended or adjusted under 35 U.S.C. 154(b) by 0 days.

(21) Appl. No.: 16/244,291

(22) Filed: Jan. 10, 2019

(65) Prior Publication Data

US 2019/0232574 A1    Aug. 1, 2019

(30) Foreign Application Priority Data

Jan. 31, 2018    (TW) .............................. 107103386 A

(51) Int. Cl.
*B29C 65/00*  (2006.01)
*B29C 65/48*  (2006.01)
(Continued)

(52) U.S. Cl.
CPC .......... *B29C 66/8266* (2013.01); *B29C 63/02* (2013.01); *B29C 65/4895* (2013.01);
(Continued)

(58) Field of Classification Search
CPC . B29C 66/8266; B29C 66/0016; B29C 66/45; B29C 63/02; B29C 65/4895; B29C 2063/0008; B29C 63/00; B29C 63/0091; B29C 63/0073; B29C 63/26; B29C 63/38; B29C 63/40; B29C 63/042; B29C 63/0004; B29C 66/82661; B29C 66/82423; B29C 66/81455; B29C 66/83; B29C 66/8248; B29C 66/00; B29C 66/0012; B29C 66/00145; B29C 66/0046; B29C 66/00461; B29C 66/01; B29C 66/474; B29C 66/494; B32B 7/12; B32B 17/02; B32B 37/1009; B32B 38/1866; B32B 2309/02; B32B 2309/12; B32B 2457/00; B32B 17/00; B32B 17/06; B32B 17/064; B32B 17/067;
(Continued)

(56) References Cited

U.S. PATENT DOCUMENTS

| | | | | |
|---|---|---|---|---|
| 3,551,177 A | * | 12/1970 | Ames | ........................ B41M 1/24 428/162 |
| 7,936,273 B2 | * | 5/2011 | Kobayashi | ....... G06K 19/07749 340/572.7 |
| 8,763,802 B2 | * | 7/2014 | Ellis-Brown | ......... G06F 1/1628 206/320 |
| 8,779,993 B2 | * | 7/2014 | Chiang | ................... B32B 37/10 156/243 |

(Continued)

FOREIGN PATENT DOCUMENTS

| | | | | |
|---|---|---|---|---|
| EP | 0254901 A2 | * | 2/1988 | .......... B29C 43/203 |
| TW | I609786 B | | 1/2018 | |

*Primary Examiner* — Michael N Orlando
*Assistant Examiner* — Abhishek A Patwardhan
(74) *Attorney, Agent, or Firm* — Rosenberg, Klein & Lee

(57) ABSTRACT

The invention provides a method for manufacturing a curved surface shell of an electronic device, which comprises the steps of preparing a translucent base shell having a decorative film; fixed-point hot pressing the decorative film to attach and position the decorative film on an inner surface of the translucent base shell; placing the translucent base shell in a vacuum sealed space to tightly bonding the decorative film to the translucent base shell; and hydraulic pressing the decorative film by high pressure and high temperature so as to be smoothly bonded to the inner surface of the translucent base shell in a liquid solvent.

10 Claims, 4 Drawing Sheets

(51) Int. Cl.
*B32B 17/02* (2006.01)
*B32B 38/18* (2006.01)
*B32B 7/12* (2006.01)
*B32B 37/10* (2006.01)
*H04M 1/02* (2006.01)
*B29C 63/02* (2006.01)
*B29C 63/00* (2006.01)

(52) U.S. Cl.
CPC .......... *B29C 66/0016* (2013.01); *B29C 66/45* (2013.01); *B32B 7/12* (2013.01); *B32B 17/02* (2013.01); *B32B 37/1009* (2013.01); *B32B 38/1866* (2013.01); *H04M 1/0283* (2013.01); *B29C 2063/0008* (2013.01); *B32B 2309/02* (2013.01); *B32B 2457/00* (2013.01)

(58) Field of Classification Search
CPC ... B32B 17/063; B32B 17/062; B32B 17/061; B32B 17/065; B32B 17/10; B32B 37/10; B32B 37/1018; B32B 37/06; B32B 38/18; B32B 38/1858; B32B 38/0036; B32B 38/004; B32B 38/0048; H04M 1/0283
See application file for complete search history.

(56) References Cited

U.S. PATENT DOCUMENTS

| | | | |
|---|---|---|---|
| 2007/0102110 A1* | 5/2007 | Yuba | B29C 70/78 156/285 |
| 2010/0314990 A1* | 12/2010 | Tsao | H04M 1/0283 313/498 |
| 2011/0005797 A1* | 1/2011 | Tsao | B44C 1/1729 174/50 |
| 2011/0151189 A1* | 6/2011 | Zhang | B29C 45/14467 428/142 |
| 2014/0345793 A1* | 11/2014 | Micarelli | B29C 43/10 156/229 |
| 2019/0039401 A1* | 2/2019 | Minamikawa | B32B 7/02 |

* cited by examiner

METHOD FOR MANUFACTURING CURVED SURFACE SHELL OF ELECTRONIC DEVICE

BACKGROUND OF THE INVENTION

1. Field of the Invention

The present invention relates to a method for manufacturing a curved surface shell of an electronic device which can correctly align patterns with an inner surface of a translucent base shell having a curved surface or a curved portion for smoothly bonding in uniform hydraulic pressure without generation of wrinkles on the curved portion.

2. Description of Related Art

With the development of modern society and the advancement of technology, people are increasingly demanding the quality of consumer electronics, e.g. lightness, slimness, small size, diverse functions, aesthetics and the like. Currently, the consumer electronics primarily have light and thin design. For high-end electronic products commonly found on the market, the outer shell materials are usually made of metals or carbon fiber composites. Both materials have high rigidity and are lightweight, so they can be generally used in small size products (e.g. smart phones, navigation devices and the like), medium size products (e.g. notebook computers, tablet computers and the like), and large size products (e.g. all-in-one computer, liquid crystal display television and the like).

In terms of smart phones, plastic has always been the best choice for the material of mobile phone shells since the invention of mobile phones, and many patterns and text marks of the mobile phones or electronic products are usually directly formed on outer surfaces of the plastic outer shells. However, the patterns and the text marks are blurred due to wear and tear after a long period of use, which greatly affects the aesthetics of the electronic products. In recent years, in order to improve the quality and aesthetics of high-end electronic products, the concept of a metal shell is introduced. Although the metal shell has the advantages of wear resistance, good texture, well heat dissipation, slimness and the like, the metal has a shielding effect on electromagnetic waves. For instance, when entering the elevator, the mobile phone immediately loses its signal, indicating that the metal has a strong shielding effect on electromagnetic waves. Therefore, in the era of 5G, the metal shell is no longer favored.

In order to improve the texture of the casing, the relevant industry has invested a lot of efforts in production and development. For instance, the Taiwan patent TWI609786 (B), issued on 1 Jan. 2018, disclosed a housing manufacturing method, a composite board, and a housing. The housing manufacturing method comprises the steps of: providing a first fiberglass plate; coating a first glue on the first fiberglass plate, wherein the first glue contains a chemical resin having a foaming function; providing a second fiberglass plate; covering the second fiberglass plate onto the first glue; and curing the first glue to become a cushion adhesive layer, wherein the first fiberglass plate, the cushion adhesive layer, and the second fiberglass plate constitute a composite board. It can be seen that the above process mainly provides a first glue between the first and second fiberglass plates, and the first glue is cured for a long time to form the cushion adhesive layer for further bonding between the first and second fiberglass plates, so the above process requiring two fiberglass plates has disadvantages of long production time and high cost.

To solve the abovementioned problems, the technique of directly filming patterns on an inner surface of the fiberglass plate was developed. Usually, each brand of electronic products has its own specific LOGO and the location of the specific LOGO. In the process of filming the LOGO, the LOGO is easily misaligned due to the improper operation of the machine module or human error. In such a case, the LOGO is not attached to the correct position, resulting in low yield. Additionally, most shells have curved peripheries, so the film usually wrinkles at the curved peripheries. The above problems remain to be solved.

SUMMARY OF THE INVENTION

In view of the above-mentioned problems, the object of the present invention is to provide a method for manufacturing a curved surface shell of an electronic device which can correctly align patterns with an inner surface of a translucent base shell having a curved surface or a curved portion for smoothly bonding in uniform hydraulic pressure without generation of wrinkles on the curved portion.

Disclosed herein is a method for manufacturing a curved surface shell of an electronic device. It mainly comprises the steps of preparing a translucent base shell having a curved portion and a decorative film on an inner surface thereof; fixed-point hot pressing the decorative film to attach and position the decorative film on the translucent base shell; placing the translucent base shell in a vacuum sealed space to tightly bond the decorative film to the translucent base shell; and hydraulic pressing the decorative film by high pressure and high temperature to smoothly bond the decorative film to the inner surface of the translucent base shell in a liquid solvent. Accordingly, patterns of the curved portion of the translucent base shell are aligned correctly and bonded smoothly in uniform hydraulic pressure without generation of wrinkles on the curved portion, so the present invention achieves the efficiency of improving the yield rate of producing the curved surface shell.

According to an embodiment of the present invention, the method comprises the steps of: (a) preparing a translucent base shell having a decorative film and fixed-point hot pressing the decorative film by a heat press head to attach and position the decorative film on an inner surface of the translucent base shell; (b) providing a vacuum environment and placing the translucent base shell in a vacuum bag to tightly bond the decorative film to the translucent base shell; and (c) placing the vacuum bag into a container filled with a liquid solvent to hydraulic press the decorative film to be smoothly bonded to the inner surface of the translucent base shell in the liquid solvent at a predetermined pressure and a predetermined temperature.

According to an embodiment of the present invention, the decorative film is fixed-point hot pressed by the heat press head at a temperature of 80-150° C. for 3-5 seconds.

According to an embodiment of the present invention, the predetermined pressure and temperature in the step (c) are 1000-7000 psi and 60-150° C., respectively, and a time range from 10 minutes to 30 minutes is taken to reach the predetermined pressure and temperature.

According to an embodiment of the present invention, the translucent base shell is made of glass, plastic or ceramic.

According to an embodiment of the present invention, the decorative film is made of polyethylene terephthalate (PET) or the decorative film is a multi-layer co-extruded polyolefin (PO) film.

Compared with the technique available now, the present invention has the following advantages:

1. The present invention accurately positions the decorative film in the translucent base shell by the step of fixed-point hot pressing to avoid the deviation of the patterns on the inner surface of the translucent base shell, so the subsequent process can be conducted more accurately and a better product appearance can be obtained after completion.

2. The present invention enlarges an area of adhesion between the decorative film and the translucent base shell by the step of providing a vacuum environment, so the decorative film is smoothly and closely adhered to the translucent base shell under vacuum.

3. The present invention places the decorative film and the translucent base shell in a liquid environment by the step of hydraulic pressing, so the decorative film can be smoothly bonded to the translucent base shell in uniform hydraulic pressure and temperature to achieve wrinkle-free and flat texture and aesthetics.

DETAILED DESCRIPTION OF THE PREFERRED EMBODIMENT

Figure 1:
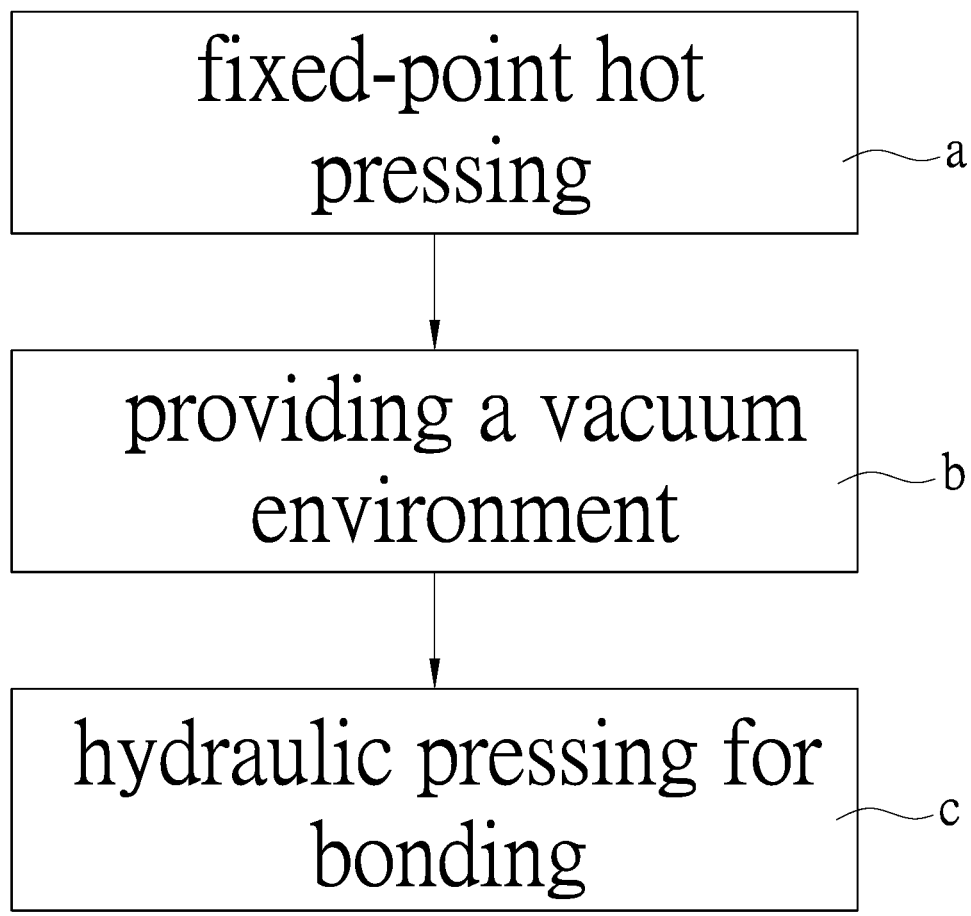
FIG. 1 is a flow chart showing a method for manufacturing a curved surface shell of an electronic device according to the present invention.

Hereinafter, an exemplary embodiment of the present invention will be described in detail with reference to the accompanying drawings.

As showed in FIG. 1 to FIG. 4, a flow chart showing a method for manufacturing a curved surface shell of an electronic device according to the present invention and cross-sectional diagrams of the method are disclosed herein. The method mainly comprises the steps of:

(a) preparing a translucent base shell (1) having a decorative film (2) and fixed-point hot pressing the decorative film (2) by a heat press head (3) to attach and position the decorative film (2) on an inner surface of the translucent base shell (1);

(b) providing a vacuum environment and placing the translucent base shell (1) in a vacuum bag (4) to tightly bond the decorative film (2) to the translucent base shell (1); and (c) placing the vacuum bag (4) to a container (5) filled with a liquid solvent to hydraulic press the decorative film (2) to be smoothly bonded to the inner surface of the translucent base shell (1) in the liquid solvent at a predetermined pressure and a predetermined temperature The translucent base shell (1) is mainly used on a 3C electronic device, e.g. a mobile phone shell, a mobile device case, their surrounding products and the like. For instance, mobile phones with the same model number are available in a variety of colors or patterns for consumers to choose from, and each brand of electronic products has its own logo. Therefore, in order to visualize the colors and LOGO patterns, the translucent base shell (1) having a transparent property is required. Preferably, the translucent base shell (1) is made of glass, plastic or ceramic. Furthermore, the decorative film (2) can be a full-color film, a pattern film, a film labeled with a LOGO and the like, and can be made of polyethylene terephthalate (PET) or an environmentally friendly multi-layer co-extruded polyolefin (PO) film.

In actual production, referring to FIG. 1 to FIG. 4, the translucent base shell (1) has plural curved surfaces or curved portions. For instance, when the translucent base shell (1) is used as a bottom shell of a mobile phone, each of the four peripheries has a curved portion and each of the four end corners also have a turning curved portion. When the decorative film (2) is a full-color film with a LOGO, the operation steps are as follows.

Figure 2:
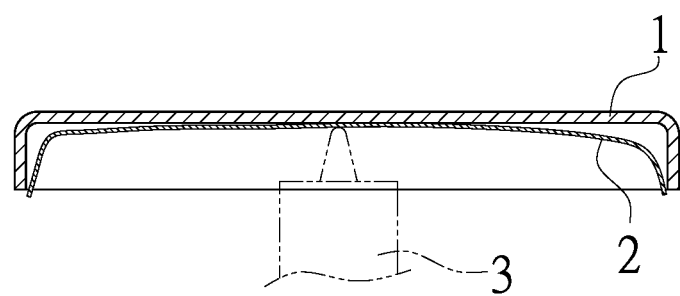
FIG. 2 is a cross-sectional diagram showing a decorative film attached and positioned on a translucent base shell by a heat press head in the step (a) according to the present invention.
Figure 3:
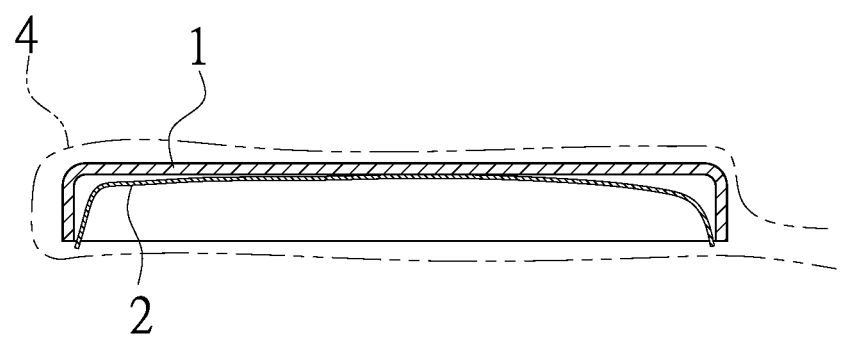
FIG. 3 is a cross-sectional diagram showing a translucent base shell placed in a vacuum bag to tightly bonding the decorative film in the step (b) according to the present invention.

First, as shown in FIG. 1 and FIG. 2, in the step (a), the translucent base shell (1) having plural curved surfaces or curved portions is placed on a platform of a module and provided with the decorative film (2) on its inner surface. After the decorative film (2) is positioned in a predetermined place for alignment, e.g. the LOGO placed in a specific direction or position, the heat press head (3) is used for fixed-point hot pressing the decorative film (2) at a temperature of 80-150° C. for 3-5 seconds so as to attach and position the decorative film (2) on the inner surface of the translucent base shell (1). Then, referring to FIG. 1 and FIG. 3, in the step (b), a vacuum environment is provided for tightly and smoothly bonding the translucent base shell (1) to the decorative film (2) so as to prevent generation of wrinkles on the curved portions. In the embodiment, the vacuum bag (4) is used for accommodating the translucent base shell (1) with the decorative film (2) attached thereto, and then the vacuum bag (4) is evacuated by a vacuum pumping device [not shown in FIG. 3] so that the decorative film (2) is tightly bonded to the translucent base shell (1) in the vacuum environment.

Figure 4:
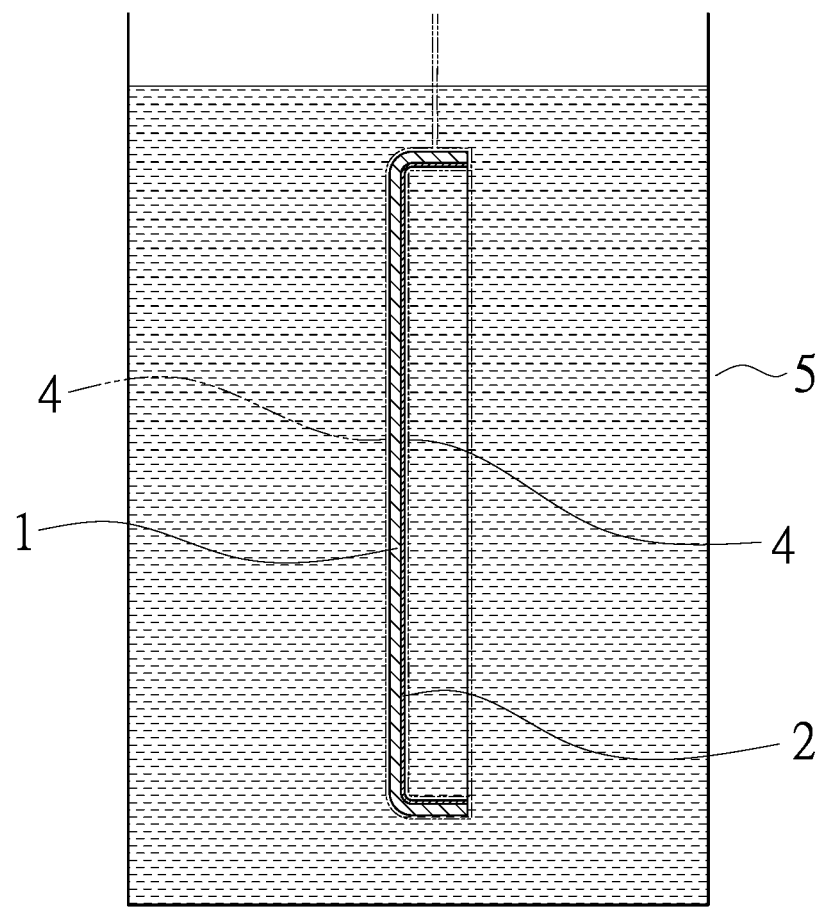
FIG. 4 is a cross-sectional diagram showing the vacuum bag placed in a container filled with a liquid solvent in the step (c) according to the present invention.

Finally, referring to FIG. 1 and FIG. 4, in the step (c), the vacuum bag (4) containing the translucent base shell (1) and the decorative film (2) from the step (b) is placed into the container (5) filled with the liquid solvent. For instance, the container (5) is a hydraulic equipment or equipment that can be pressurized and heated in a closed state. Suitable means for filling the container with the liquid solvent include but are not limited to a technique of injection. The vacuum bag (4) is further immersed in the liquid solvent of the container (5) while the liquid solvent in the container is treated at a predetermined pressure of 1000-7000 psi and a predetermined temperature of 60-150° C. for 10-30 minutes, so as to hydraulic press the decorative film (2) to be smoothly bonded to the inner surface of the translucent base shell (1) in the liquid solvent.

By the abovementioned high pressure and high temperature condition, the inner surface of the translucent base shell (1) and the decorative film (2) both present a slightly melted state. Therefore, the decorative film (2) can be smoothly bonded to the inner surface of the translucent base shell (1) in the liquid solvent under the high pressure and high temperature condition.

Compared with the technique available now, the present invention has the following advantages:

1. The present invention accurately positions the decorative film in the translucent base shell by the step of fixed-point hot pressing to avoid the deviation of the patterns on the inner surface of the translucent base shell, so the subsequent process can be conducted more accurately and a better product appearance can be obtained after completion.

2. The present invention enlarges an area of adhesion between the decorative film and the translucent base shell by the step of providing a vacuum environment, so the decorative film is smoothly and closely adhered to the translucent base shell under vacuum.

3. The present invention places the decorative film and the translucent base shell in a liquid environment by the step of hydraulic pressing, so the decorative film can be smoothly bonded to the translucent base shell in uniform hydraulic pressure and temperature to achieve wrinkle-free and flat texture and aesthetics.

What is claimed is:

1. A method for manufacturing a curved surface shell of an electronic device, comprising:
    preparing a translucent base shell and a decorative film;
    fixed-point hot pressing the decorative film by a heat press head to attach a portion of the decorative film on an inner surface of the translucent base shell and thereby fixedly position the decorative film thereon;
    placing the translucent base shell and the decorative film attached thereto in a vacuum bag;
    providing a vacuum environment within the vacuum bag to closely adhere the decorative film to the translucent base shell;
    disposing the vacuum bag in a container filled with a liquid solvent; and
    hydraulically pressing the decorative film within the vacuum bag by establishing a predetermined pressure and a predetermined temperature of the liquid solvent, the decorative film being thereby smoothly and uniformly bonded across the inner surface of the translucent base shell.

2. The method for manufacturing a curved surface shell of an electronic device as claimed in claim 1, wherein the decorative film is fixed-point hot pressed by the heat press head at a temperature of 80-150° C. for 3-5 seconds.

3. The method for manufacturing a curved surface shell of an electronic device as claimed in claim 1, wherein the predetermined pressure and temperature of the liquid solvent during the hydraulic pressing are 1000-7000 psi and 60-150° C., respectively.

4. The method for manufacturing a curved surface shell of an electronic device as claimed in claim 2, wherein the predetermined pressure and temperature of the liquid solvent during the hydraulic pressing are 1000-7000 psi and 60-150° C., respectively.

5. The method for manufacturing a curved surface shell of an electronic device as claimed in claim 3, wherein the liquid solvent in the container is treated at the predetermined pressure and temperature for 10-30 minutes during the hydraulic pressing.

6. The method for manufacturing a curved surface shell of an electronic device as claimed in claim 4, wherein the liquid solvent in the container is treated at the predetermined pressure and temperature for 10-30 minutes during the hydraulic pressing.

7. The method for manufacturing a curved surface shell of an electronic device as claimed in claim 5, wherein the translucent base shell is made of glass, plastic or ceramic.

8. The method for manufacturing a curved surface shell of an electronic device as claimed in claim 6, wherein the translucent base shell is made of glass, plastic or ceramic.

9. The method for manufacturing a curved surface shell of an electronic device as claimed in claim 7, wherein the decorative film is made of polyethylene terephthalate (PET) or the decorative film is a multi-layer co-extruded polyolefin (PO) film.

10. The method for manufacturing a curved surface shell of an electronic device as claimed in claim 8, wherein the decorative film is made of polyethylene terephthalate (PET) or the decorative film is a multi-layer co-extruded polyolefin (PO) film.

* * * * *